US007904611B2

(12) United States Patent
Takezaki

(10) Patent No.: US 7,904,611 B2
(45) Date of Patent: Mar. 8, 2011

(54) WIRELESS COMMUNICATION APPARATUS AND CONTROL METHOD FOR THE SAME

(75) Inventor: Satoshi Takezaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/643,695

(22) Filed: Dec. 21, 2009

(65) Prior Publication Data

US 2010/0164300 A1    Jul. 1, 2010

(30) Foreign Application Priority Data

Dec. 25, 2008    (JP) ............................. 2008-331340

(51) Int. Cl.
*G06F 3/00* (2006.01)
(52) U.S. Cl. ........................................ 710/15; 713/323
(58) Field of Classification Search ................. 710/15, 710/17
See application file for complete search history.

(56) References Cited

U.S. PATENT DOCUMENTS

| 6,804,792 B2 * | 10/2004 | Nishikawa .................. 713/323 |
| 2009/0172430 A1 * | 7/2009 | Takenouchi .................. 713/310 |
| 2009/0299541 A1 * | 12/2009 | Park et al. .................... 700/295 |
| 2010/0079597 A1 * | 4/2010 | Stokes et al. ................. 348/184 |
| 2010/0115318 A1 | 5/2010 | Suzuki et al. |
| 2010/0131782 A1 * | 5/2010 | Higuchi ....................... 713/310 |

FOREIGN PATENT DOCUMENTS

| JP | 2008-034907 | 2/2008 |
| JP | 2008-141562 | 6/2008 |
| JP | WO 2009/084080 | 9/2009 |
| WO | WO 2008/108070 | 12/2008 |

* cited by examiner

*Primary Examiner* — Henry W Tsai
*Assistant Examiner* — Elias Mamo
(74) *Attorney, Agent, or Firm* — Blakely Sokoloff Taylor & Zafman, LLP

(57) ABSTRACT

According to one embodiment, a wireless communication apparatus includes a receptacle, a power supply controller and a control module. The receptacle is adapted to receive an audio and visual (AV) signal in which a video signal and an audio signal are superimposed on each other, and various commands for operation control. These various commands may be defined in a HDMI-CEC standard. The power supply controller is configured to supply drive power to the wireless communication module. The control module is configured to control the power supply controller, to acquire setting information showing whether the electronic equipment is set to be activated in response to an activation command. The setting information is acquired based on expansion commands, which are vendor specific commands, transmitted and received through the receptacle.

6 Claims, 4 Drawing Sheets

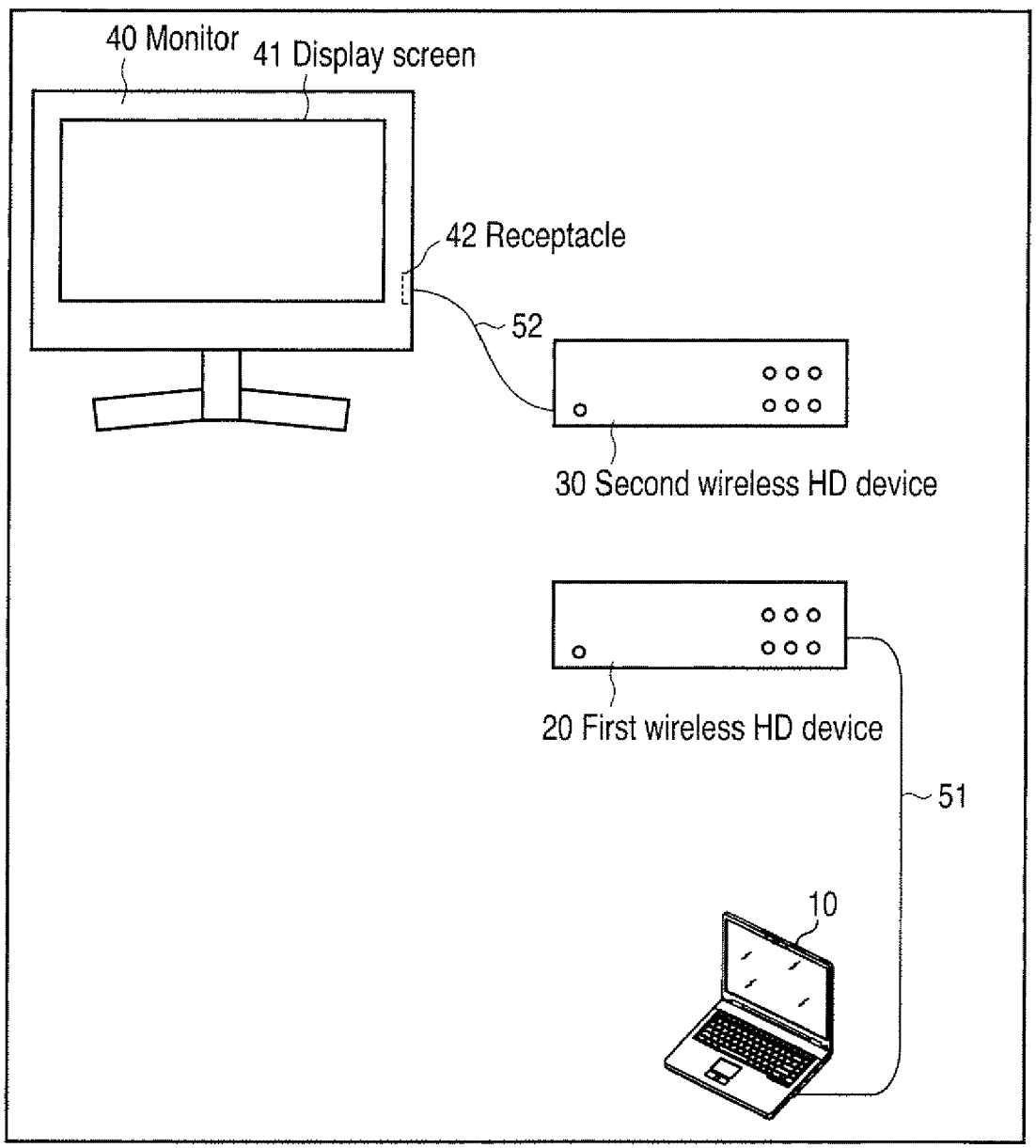
F I G. 1

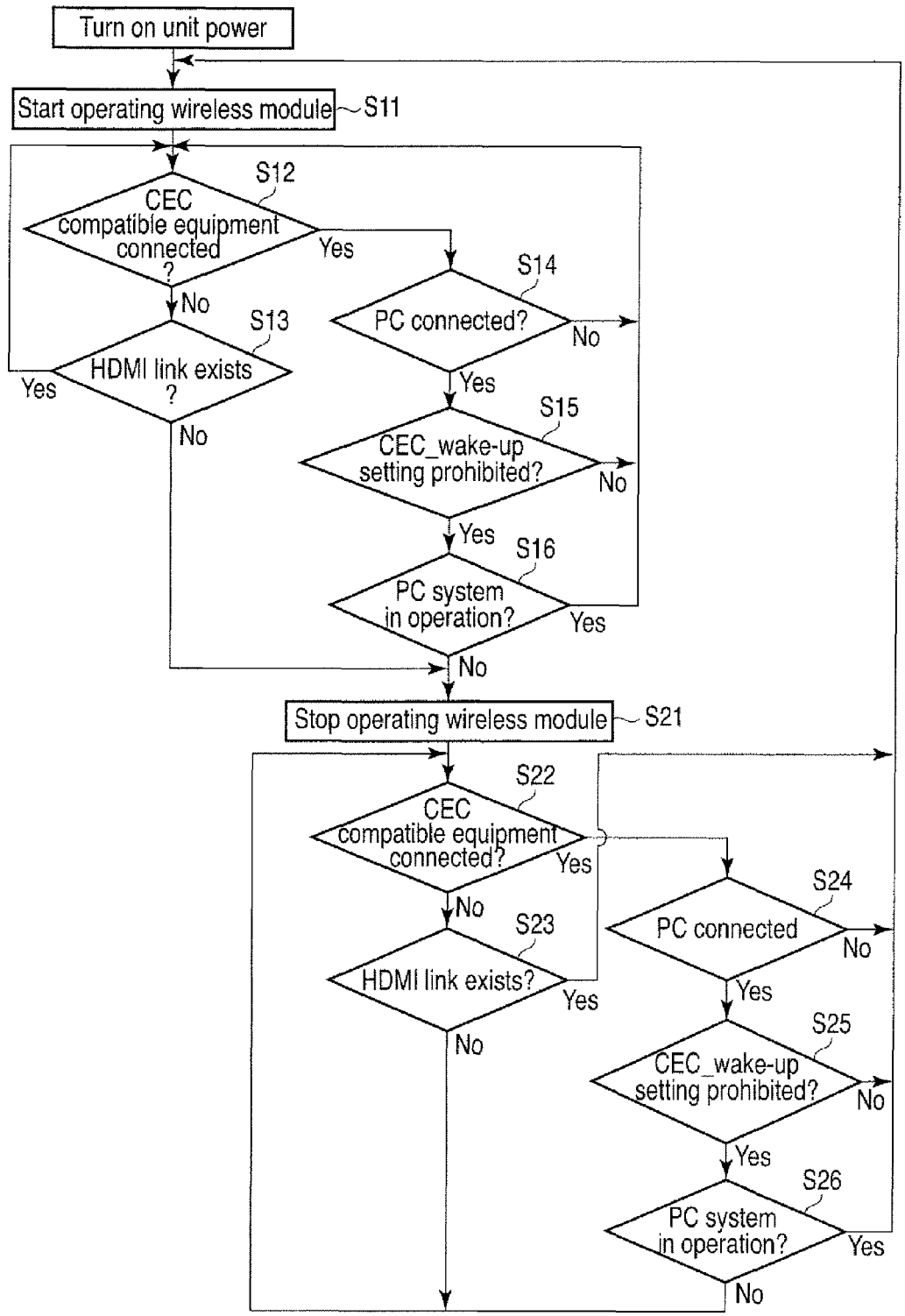
F I G. 4

WIRELESS COMMUNICATION APPARATUS AND CONTROL METHOD FOR THE SAME

CROSS-REFERENCE TO RELATED APPLICATIONS

This application is based upon and claims the benefit of priority from Japanese Patent Application No. 2008-331340, filed Dec. 25, 2008, the entire contents of which are incorporated herein by reference.

BACKGROUND

1. Field

One embodiment of the invention relates to a wireless communication apparatus configured to reduce power consumption and a control method for the wireless communication apparatus.

2. Description of the Related Art

A standard for transmitting an audio and visual (AV) signal in which a video signal and an audio signal are superimposed on each other and a consumer electronics control (CEC) signal for controlling equipment, which has been transmitted through a high-definition multimedia interface (HDMI) cable through a wireless millimeter-wave signal, has been developed already, and a wireless communication apparatus for transmitting the AV signal and the CEC signal will be realized soon.

Meanwhile, a wireless communication apparatus which is compatible with HDMI-CEC for transmitting the CEC signal is not allowed to turn off a wireless communication unit so as to achieve a specification of the HDMI-CEC.

AV equipment comprising a first connection means for connecting to external equipment through a narrowband transmission path; and a second connection means for connecting to external equipment through a wideband transmission path, and receiving a command of power-on transmitted from the external equipment to start power supply to a circuit concerning the second connection means is disclosed in Jpn. Pat. Appln. KOKAI Publication No. 2008-34907.

As mentioned above, the wireless communication unit has not been allowed to turn off, which has not enabled reducing the power consumption.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view depicting a configuration of an HDMI system regarding one embodiment of the invention;

FIG. 4 is an exemplary flowchart depicting a procedure of processing in which the first wireless HD device depicted in FIG. 2 controls a drive power source supplying power to a wireless communication unit.

DETAILED DESCRIPTION

Figure 2:
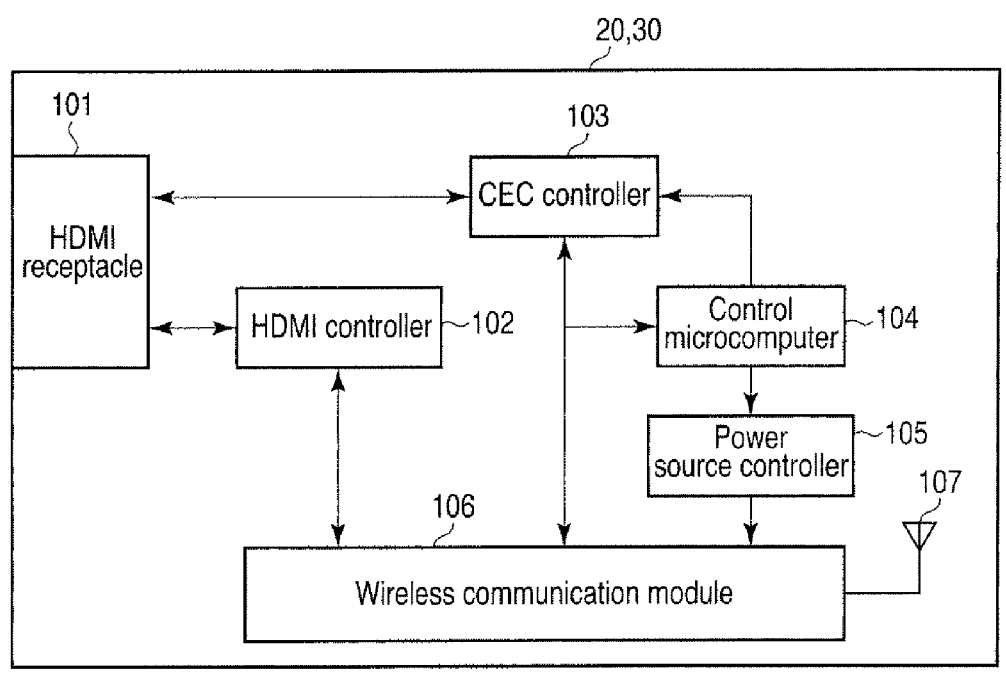
FIG. 2 is an exemplary view depicting a configuration of a first wireless HD device and a second wireless HD device depicted in FIG. 1.

Various embodiments according to the invention will be described hereinafter with reference to the accompanying drawings. In general, according to one embodiment of the invention, a wireless communication apparatus comprises a receptacle configured to be inserted one end of a cable for transmitting and receiving an audio and visual (AV) signal in which a video signal, an audio signal are superimposed on each other, commands, and messages, a wired communication module configured to transmit the commands and the messages through the receptacle and to receive the commands and the messages the through the receptacle, a signal controller configured to transmit the AV signal through the receptacle or receive the AV signal through the receptacle, a wireless communication module configured to transmit and receive the AV signal and the commands, a power supply module configured to supply drive power for driving the wireless communication module to the wireless communication module, and a power supply controller configured to transmit a first command, to an electronic equipment using the wired communication module, for instructing to transmit setting message showing whether the electronic equipment is set to be activated in response to an activation command transmitted from the wired communication device, to transmit a second command, to the electronic equipment using the wired communication module, for instructing to transmit a state message showing whether the electronic equipment is in operation when the setting message shows that the electronic equipment is set to be activated in response to the activation command, to determine whether the electronic equipment is in operation based on the state message, and to instruct the power supply module to stop supplying the drive power to the wireless communication module when it is determined that the electronic equipment is not being activated.

Hereinafter, embodiments of the invention will be described with reference to the drawings.

FIG. 1 shows a schematic view illustrating a high-definition multimedia interface (HDMI) system regarding one embodiment of the invention.

As shown in FIG. 1, the HDMI system includes a notebook personal computer (electronic equipment) 10, a first wireless HD device (wireless communication device, first wireless communication device) 20, a second wireless HD device (second wireless communication device) 30, and a monitor (display device) 40.

The computer 10 and the first wireless HD device 20 are connected through an HDMI cable 51. The second wireless HD device 30 and the monitor 40 are connected through an HDMI cable 52. The HDMI cables 51, 52 are used for transmitting an AV signal in which a video signal and an audio signal are superimposed on each other on the basis of the HDMI standard. CEC lines for transmitting signals based on the HDMI-CEC standard are laid in the HDMI cables 51, 52. The HDMI-CEC standard is a serial communication protocol for mutually controlling HDMI connection equipment through one terminal (CEC terminal) disposed at an HDMI terminal.

The computer 10 controls the first wireless HD device 20 and becomes a supply source of the AV signal. The first wireless HD device 20 has functions of modulating the AV signal supplied through the HDMI cable 51 and of transmitting the modulated signal by using a wireless signal of a millimeter wave. The second wireless HD device 30 receives a signal transmitted from the first wireless HD device 20, generates the AV signal by demodulating the received signal, and transmits the generated AV signal to the monitor 40 through the HDMI cable 52. The HD devices 20, 30 each have functions to transmit/receive CEC commands transmitted through the CEC lines.

The monitor 40 has a receptacle 42 into which the HDMI cable 52 is inserted.

Next, configurations of the HD devices 20, 30 will be described with reference to FIG. 2.

As shown in FIG. 2, each HD devices 20, 30 includes an HDMI receptacle 101, an HDMI controller 102, a CEC controller 103, a control microcomputer 104, a power source controller 105, a wireless communication module 106, and an antenna 107.

The HDMI receptacle 101 is a terminal provided for removably connecting the HDMI cable. The CEC controller 103 executes data transfer control for transmitting/receiving various commands for operation control through the HDMI receptacle 101 under the control by means of the control microcomputer 104.

The HDMI controller 102 executes processing for receiving the AV signal received through the HDMI receptacle 101 to transmit the processed signal to the communication module 106. The HDMI controller 102 executes processing for transmitting the AV signal received through the communication module 106 to the HDMI cable inserted into the HDMI receptacle 101.

The power source controller 105 controls supply of a drive power to the communication module 106 under the control of the control microcomputer 104. The communication module 106 modulates the AV signal received by the HDMI controller 102 through the HDMI receptacle 101 to transmit a wireless signal of a millimeter wave from the antenna 107. The communication module 106 demodulates the wireless signal received by the HDMI receptacle 101 through the antenna 107 to generate the AV signal, and transfers the generated AV signal to the HDMI controller 102.

Figure 3:
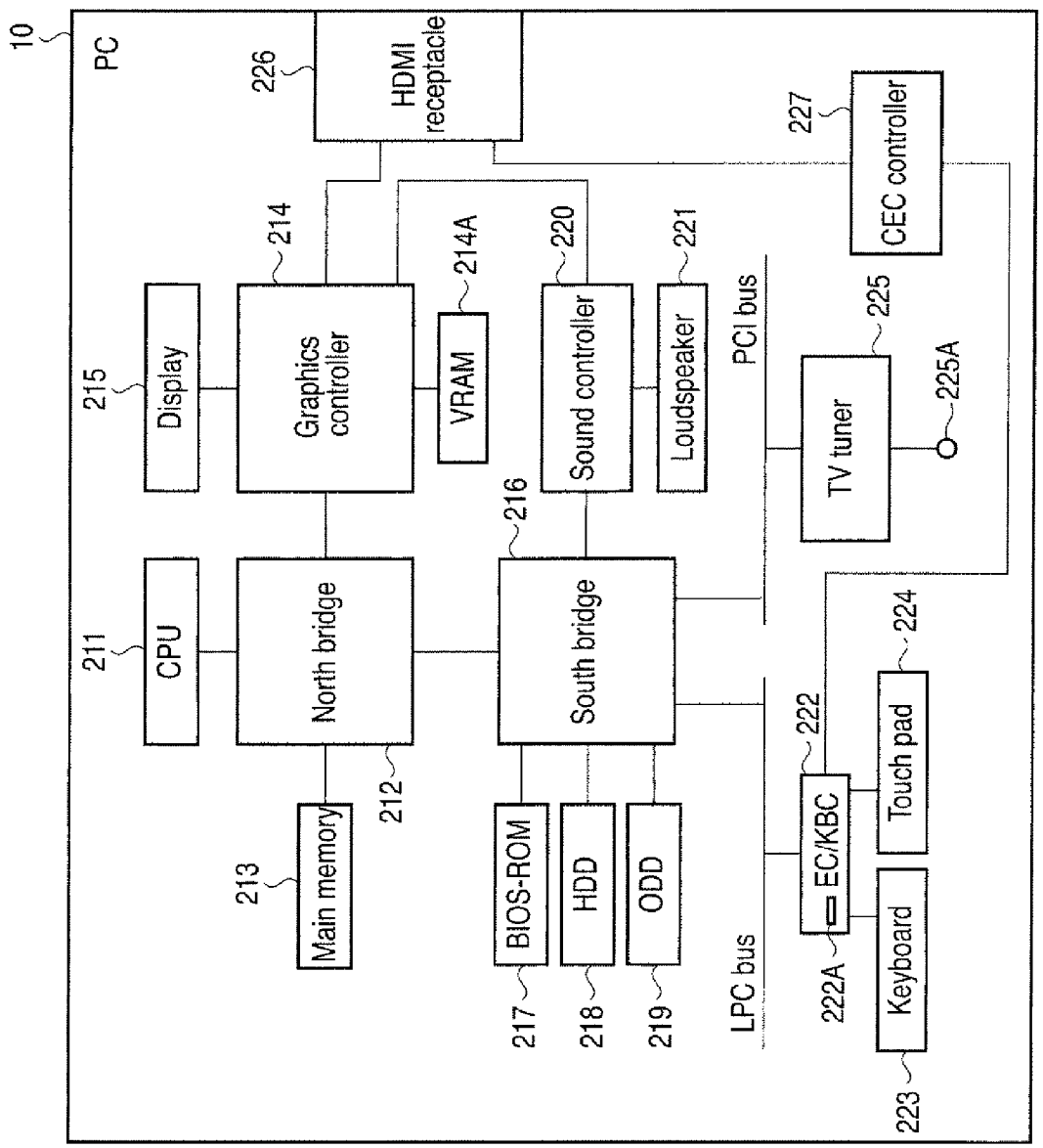
FIG. 3 is an exemplary view depicting a configuration of a notebook personal computer depicted in FIG. 1.

Next, a system configuration of electronic equipment will be described with reference to FIG. 3. FIG. 3 shows a block diagram illustrating the system configuration of the electronic equipment regarding one embodiment of the invention. This electronic equipment is, for example, realized by the personal computer 10.

As shown in FIG. 3, an information process apparatus 1 includes a CPU 211, a north bridge 212, a main memory 213, a graphics controller 214, a VRAM 214A, a display 215, a south bridge 216, a Basic Input/Output System (BIOS)-ROM 217, an HDD 218, an optical magnetic disc drive device (ODD) 219, a sound controller 220, a loudspeaker 221, an embedded controller/keyboard controller (EC/KBC) 222, a keyboard 223, a touch pad 224, a television (TV) tuner 225, an HDMI receptacle 226, and a CEC (inter-equipment interactive control) controller 227.

The CPU 211 is a processor for controlling an operation of each module in the processor. The CPU 211 executes an operating system (OS) to be loaded on the main memory 213 from the HOD 218, and various programs to be operated under the control by the OS. The OS has a window system for displaying a plurality of windows on a display screen. The CPU 211 executes a BIOS stored in the BIOS-ROM 217. Hereinafter, a basic input/output system itself stored in the BIOS-ROM 217 may be referred to as the BIOS 217.

The north bridge 212 is a bridge device for connecting between the local bus of the CPU 211 and the south bridge 216. The north bridge 212 has a function of communicating with the graphics controller 214 via the bus and has a built-in memory controller for access-controlling the main memory 213. The graphics controller 214 is a display controller for controlling the display 215 on the information process apparatus 1 side. The graphics controller 214 generates a video signal which is to be transmitted to the display 215, from the image data written in the VRAM 214A. The graphics controller 214 further has a function of externally outputting the AV signal, in which the audio signal and the video signal generated by the sound controller 220 are superimposed on each other, from the HDMI receptacle 226.

The south bridge 216 is a controller for controlling various devices on a PCI bus and an LPC bus. The south bridge 216 is directly connected to the BIOS-ROM 217, HDD 218, ODD 219 and sound controller 220, and has a function of controlling them. For instance, TV broadcasting program data, and AV content, etc. downloaded via the Internet are stored in the HDD 218. For instance, an HOD, a DVD, etc., with AV content stored thereon are stored in the ODD 219. The sound controller 220 is a sound source controller for controlling the loudspeaker 221. The sound controller has a function to externally output the audio signal from the HDMI receptacle 226. Reproduced data of the content stored in the HDD 218 is output to the first wireless HD device 20 through the HDMI cable 51.

The EC/KBC 222 is one chip microcomputer in which an embedded controller for managing power and a keyboard controller for controlling the keyboard 223 and the touch pad 224 are integrated. The nonvolatile memory 223A is mixedly mounted on the EC/KBC 222.

The HDMI receptacle 226 is a terminal disposed to removably connect the HDMI cable 3. The CEC controller 227 executes data transfer control for transmitting/receiving various commands for operation control through the HDMI receptacle 226, under the control by the EC/KBC 222. The CEC controller 227 has a function for requesting the EC/KBC 222 to activate the system when receiving an activation command.

The TV tuner 225 is a reception device for receiving broadcasting program data broadcasted through a TV broadcasting signal, and is connected to an antenna terminal 225A. The TV tuner 225 is actualized, for example, as a digital TV tuner configured to receive a digital broadcasting program such as a terrestrial digital TV broadcast. The TV tuner 225 has a function of capturing video data input from external equipment.

The wireless communication module 106 of the wireless HD device has to continually operate in principal. This is because there is a possibility of receiving, for example, a wake-up request from a monitor 40 side, and it is necessary to transmit the wake-up request wirelessly to the computer 10.

(A) However, the computer 10 makes it possible to disable the wake-up by the CEC, and if the setting is done, the stop of power supply to the communication module 106 to turn off the function of the communication module 106 does not lead to a problem.

(B) In a case where no HDMI device supporting the CEC is connected to the wireless HD module, since the wake-up is not controlled, the power of the communication module 106 may be turned on/off simply depending on whether or not the communication through the HDMI is performed. A link detection signal of a HDMI signal owned by a control IC of the HDMI may recognize, whether or not the communication through the HDMI is performed.

A procedure of processing for performing on/off control of the communication module 106 on the basis of the above technical idea will be described with reference to FIG. 4.

Setting information showing whether or not the system is activated in accordance with the wake-up request is stored in the nonvolatile memory 223A mixedly mounted on the EC/KBC 222 of the computer 10.

When the power of the first wireless HD device 20 is turned on, the control microcomputer 104 instructs the power source controller 105 so as to supply power to the communication module 106 in order to operate it (Block S11). The control microcomputer 104 performs polling of a command of "give physical address" defined in HDMI 1.3a standard to the connected CEC equipment. The polling is repeatedly performed, for example, five times in order to improve connection certainty. If equipment corresponding to the CEC is connected to a logical address, which has executed the polling, the control microcomputer 104 transmits a physical address and a device name to the first wireless HD device 20 as a response to the polling.

The control microcomputer 104 determines whether or not any equipment corresponding to the CEC is connected to the HDMI receptacle 101 (Block S12). To perform this processing, the control microcomputer 104 determines the presence or absence of the equipment which has returned the physical address and the device name as the response. If no equipment has returned the response, the control microcomputer 104 determines that no equipment corresponding to the CC is connected to the HDMI receptacle 101. If any equipment has returned the response, the control microcomputer 104 determines whether or not any equipment corresponding to the CEO is connected to the HDMI receptacle 101. For instance, it is assumed that a physical address (1.3.0.0) is assigned to the first wireless HD device 20. If the physical address of the equipment which has returned the response is (1.3.X.X.), it may be determined that the physical address of the equipment which has returned the response is the equipment connected to the HOD device 20. If the physical address of the equipment which has returned the response is other than (1.3.X.X.), it may be determined that no equipment corresponding to the CEC is connected to the HDMI receptacle 101.

If it is determined that no equipment is connected to the HDMI receptacle 101 (No, Block S12), the control microcomputer 104 determines whether or not an HDMI link exists, namely, TDMS communication has been made or not (Block S13). If it is determined that the HDMI link exists (Yes, Block S13), the control microcomputer 104 maintains a state in which the control microcomputer 104 and the communication module 106 are operated and returns to Block S12. If it is determined that an HDMI link does not exist (No, Block S13), the control microcomputer 104 instructs the power source controller 105 to stop the supply of the drive power to the communication module 106 in order to stop the operations of the communication module 106 (Block S21).

In Block 512, if it is determined that any equipment is connected to the HDMI receptacle 101 (Yes, Block S12), the control microcomputer 104 stores setting information showing the operations for the wake-up request, and determines whether or not the computer 10 for transmitting the setting information is connected to the receptacle 101 (Block S14). For instance, the control microcomputer 104 uses the CEC controller 103 to transmit a "give device vender ID" message for instructing the transmission of a vender ID of connected equipment to the HDMI cable 51 from the HDMI receptacle 101. The equipment which has received the "give device vender ID" message returns a "device vender ID" message including the vender ID as a response. The control microcomputer 104 determines whether or not the vender ID assigned to its own equipment and the vender ID included in the response agree with each other. If the vender IDs do not agree with each other, it is determined that the computer 10 for transmitting the setting information has not been connected. If the vender IDs agree with each other, the control microcomputer 104 transmits a vender specific command (message) for instructing to transmit the setting information. If a vender specific command (message) including the setting information is replied for the vender specific command, it is determined that the computer 10 capable of transmitting the setting information is connected to the HDMI receptacle 101. If no vender specific command (message) including the setting information is replied for the vender specific command, it is determined that the computer 10 for transmitting the setting information is not connected to the HDMI receptacle 101.

If it is determined that the computer 10 is not connected to the HDMI receptacle 101 (No, Block 14), the control microcomputer 104 returns to Block S12 while maintaining the communication module 106 in an operation state. If it is determined that the computer 10 is connected to the HDMI receptacle 101 (Yes, Block S14), the control microcomputer 104 executes processing for determining whether or not the setting of the CEC wake-up for turning on the computer 10 is prohibited (Block S15). Here, in terms of the vender specific command received in advance, it is determined whether or not the setting of the CEC wake-up is prohibited with reference to the vender specific command (message) including the setting information.

If it is determined that the setting of the CEC wake-up is not prohibited (No, Block S15), the control microcomputer 104 returns to Block S12 while maintaining the communication module 106 in the operation state. If it is determined that the setting of the CEC wake-up is prohibited (Yes, Block S15), the control microcomputer 104 determines whether or not the system of the computer 10 is in operation (Step S16). The computer 10 transmits a "device power status" message to the computer 10 to determine whether or not the system is in operation in response to a response message from the computer 10. The "device power status" message and its response message are commands defined in the HDMI 1.3a standard.

If it is determined that the system is in operation (Yes, Step S16), since there is a possibility for the computer 10 to make communication by using the wireless communication module 106, the control microcomputer 104 maintains the communication module 106 to be in the operation state and returns to Step S12. If it is determined that the communication module is not in the operation state (No, Step S16), the control microcomputer 104 instructs the power source controller 105 to stop supplying the drive power to the communication module 106 (Step S21).

After stopping the communication module 106, the control microcomputer 104, in a manner similar to Step S11, determines whether or not the equipment corresponding to the CEC is connected to the HDMI receptacle 101 (Step S22). If it is determined that no equipment is connected to the HDMI receptacle 101, the control microcomputer 104 determines whether or not the HDMI link exists in a manner similar to Step S13 (Step S23). If it is determined that the HDMI link does not exist, the control microcomputer 104 returns to Step S22 while maintaining the communication module 10 to stop its operations (Yes, Step 23), the control microcomputer 104 instructs the controller 105 to start supplying the drive power to the communication module 106 (Step S11).

In Step S22, if it is determined that the equipment corresponding to the CEC is connected to the HDMI receptacle 101, similarly to Step S14, the control microcomputer 104 determines whether or not the computer 10 is connected to the HDMI receptacle 101 (Step S24). If it is determined that the computer 10 is not connected to the HDMI receptacle 101 (No, Step S24), the control microcomputer 104 instructs the controller 105 to start supplying the drive power to the communication module 106 in order to restart operations of the communication module 106 (Step S11). If the control microcomputer 104 determines that the computer 10 is connected to the receptacle 101 (Yes, Step S24), the control microcomputer 104 executes processing for determining whether or not the setting of the wake-up of the CEC of the computer 10 is prohibited (Step S25).

If the control microcomputer 104 determines that the setting of the CEC wake-up is not prohibited (No, Step S25), the control microcomputer 104 instructs the power source controller 105 so as to start supplying the drive power to the communication module 106 in order to restart the operations of the communication module 106 (Step S11).

If it is determined that the setting of the CEC wake-up is prohibited (Yes, Step S25), the microcomputer 204 determines whether or not the system in the computer 10 is in operation (Step S26). If it is determined that the system is in operation (Yes, Step S26), the control microcomputer 104 instructs the controller 105 to start supplying the drive power to the communication module 106 in order to restart the operations of the communication module 106 (Step S11). If it is determined that the system is not in operation (No, Step S26), the control microcomputer 104 maintains the operations of the communication module 106 in a stop state to return to Step S22.

In the procedures given above, in a case in which the operations of the communication module 106 of the first wireless HD device 20 may stop, the operations of the communication module 106 may be stopped, and the power consumed in the first wireless HO device 20 may be reduced. After stopping the operations of the communication module 106, the operations of the communication module 106 may be started if necessary.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a receptacle configured to be inserted on one end of a cable for transmitting and receiving an AV signal in which a video signal and an audio signal are superimposed on each other, and various commands for operation control;
a wireless communication module configured to transmit and receive the AV signal and the various commands;
a power supply controller configured to supply drive power to the wireless communication module; and
a control module configured to control the power supply controller, to acquire, from an electronic equipment, setting information showing whether the electronic equipment is set to be activated in response to an activation command, the setting information is acquired based on expansion commands transmitted and received through the receptacle, to determine whether the electronic equipment is in operation based on commands transmitted and received through the receptacle when the setting information shows that the electronic equipment is in operation, and to instruct the power supply controller to stop supplying the drive power to the wireless communication module when it is determined that the electronic equipment is not being activated,
wherein the various commands are defined in a HDMI-CEC (high definition multimedia interface for consumer electronics control) standard, and the expansion commands are a vender specific command.

2. The apparatus of claim 1, wherein
after the control module instructs to stop supplying the drive power, the power supply controller is configured to determine whether the electronic equipment is able to transmit and receive the various commands based on the various commands transmitted and received through the receptacle, and to instruct the power supply controller to start supplying the drive power to the wireless communication module when it is determined that the electronic equipment does not transmit and receive the various commands.

3. The apparatus of claim 2, wherein
the control module is configured to receive, based on the expansion commands transmitted and received through the receptacle, setting information showing whether the electronic equipment is activated in response to the activation command when it is determined that the electronic equipment is able to transmit and receive the various commands, and to instruct the power supply controller to start supplying the drive power to the wireless communication module when the setting information shows that the electronic equipment is not being activated.

4. The apparatus of claim 3, wherein
the control module is configured to determine whether the electronic equipment is in operation based on second commands transmitted and received through the receptacle when the power supply controller detects that the electronic equipment is in operation, and to instruct the power supply controller to start supplying the drive power to the wireless communication module when it is determined that the electronic equipment is activated.

5. An electronic equipment connected to a wireless communication apparatus, comprising:
a receptacle configured to be inserted on one end of a cable for transmitting and receiving an AV signal in which a video signal and an audio signal are superimposed on each other, and various commands for operation control;
a storage module configured to store setting information showing whether the electronic equipment is set to be activated in response to an activation command received through the receptacle; and
a transmitter configured to transmit, to a transmission source of a first message, the setting information by using a second message in response to the first message received through the receptacle, and to transmit, to the transmission source, a state message showing a power state of the electronic equipment in response to a third message for confirming the power state of the electronic equipment, and the command received through the receptacle,
wherein the various commands are defined in a HDMI-CEC (high definition multimedia interface for consumer electronics control) standard, and the expansion commands are a vender specific commands.

6. A control method of a wireless communication apparatus configured to transmit an AV signal in which a video signal and an audio signal are superimposed on each other through wireless communication, the AV signal transmitted from an electronic equipment, wherein the wireless communication apparatus comprises a first receptacle configured to be inserted one end of a cable for inputting and outputting the AV signal, and various commands for operation control, a wireless communication module configured to transmit the AV signal and to transmit and receive the commands, and a power supply controller configured to supply drive power for driving the wireless communication module to the wireless communication module, the electronic equipment comprises a second receptacle configured to be inserted on one end of a cable for inputting and outputting the AV signal, and commands for operation control, and a storage module configured to store setting information showing whether the electronic equipment is activated in response to an activation command received through the second receptacle, the method comprising:

transmitting, from the wireless communication apparatus to the electronic equipment through the first receptacle, a first message for acquiring a second message showing the setting information;

transmitting, from the electronic equipment to the wireless communication apparatus through the second receptacle, the second message showing the setting information in response to the first message received through the second receptacle;

transmitting, from the wireless communication apparatus to the electronic equipment through the first receptacle, a third message for inquiring of a power state of the electronic equipment when the second message shows activation of the electronic equipment;

transmitting, from the electronic equipment to the wireless communication apparatus through the second receptacle, a fourth message in response to the third message received through the second receptacle, the fourth message showing that the power state of the electronic equipment;

determining whether the electronic equipment is in operation based on the fourth message received through the first receptacle; and instructing the power supply controller to stop supplying the drive power to the wireless communication module when it is determined that the electronic equipment is not in operation, wherein the various commands, the third message, and fourth message are defined in the HDMI-CEC (high definition multimedia interface for consumer electronics control) standard, and the first message and second message are vender specific commands.

* * * * *